US007383417B2

(12) United States Patent
Yasue et al.

(10) Patent No.: US 7,383,417 B2
(45) Date of Patent: Jun. 3, 2008

(54) PREFETCHING APPARATUS, PREFETCHING METHOD AND PREFETCHING PROGRAM PRODUCT

(75) Inventors: Toshiaki Yasue, Sagamihara (JP); Hideaki Komatsu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 11/377,518

(22) Filed: Mar. 15, 2006

(65) Prior Publication Data
US 2007/0005905 A1    Jan. 4, 2007

(30) Foreign Application Priority Data
Mar. 16, 2005    (JP)    ............................. 2005-075672

(51) Int. Cl.
G06F 9/26    (2006.01)
G06F 9/34    (2006.01)
G06F 12/00    (2006.01)

(52) U.S. Cl. ..................................... 711/213; 712/207
(58) Field of Classification Search ................ 711/213; 712/207
See application file for complete search history.

(56) References Cited

U.S. PATENT DOCUMENTS

| | | | | |
|---|---|---|---|---|
| 5,490,113 A * | 2/1996 | Tatosian et al. | ....... | 365/189.05 |
| 6,134,643 A * | 10/2000 | Kedem et al. | ............... | 711/213 |
| 6,173,392 B1 * | 1/2001 | Shinozaki | ................... | 712/207 |
| 6,311,260 B1 * | 10/2001 | Stone et al. | ................. | 711/213 |
| 7,143,399 B2 * | 11/2006 | Civlin | ........................ | 717/140 |
| 7,284,014 B2 * | 10/2007 | Idei et al. | ................. | 707/104.1 |
| 2003/0023663 A1 * | 1/2003 | Thompson et al. | ......... | 709/108 |

OTHER PUBLICATIONS

Feiertag and Organick, The Multics Input/Output System, Proceedings of Third Symposium on Operating System Principles, pp. 35-41, 1971.
M.K. Kusick, W.J.Joy, S.J. Leffler, R.S. Falbray, "A Fast File System For Unix," ACM Transactions on Computer Systems, 2 (3), pp. 181-197, 1984.
H. Lei and D. Duchamp, "An Analytical Approach to File Prefetching," USENIX, 1987.
J. Griffioen and R. Appleton, "Reducing File System Latency Using A Predictive Approach," in Proceedigns of the Usenix Summer technical Conference on 197-207 1994.

(Continued)

*Primary Examiner*—Matt Kim
*Assistant Examiner*—Edward J Dudek
(74) *Attorney, Agent, or Firm*—Richard M. Goldman; Shimokaji & Associates, P.C.

(57) ABSTRACT

The efficient performance of prefetching of data prior to the reading of the data by a program. A prefetching apparatus, for prefetching data from a file to a buffer before the data is read by a program, includes: a history recorder, for recording a history for a plurality of data readings issued by the program while performing data reading; a prefetching generator, for generating a plurality of prefetchings that correspond to the plurality of data readings recorded in the history; a prefetching process determination unit, for determining, based on the history, the performance order for the plurality of prefetchings; and a prefetching unit, for performing, when following the determination of the performance order the program is executed, the plurality of prefetchings in the performance order.

1 Claim, 10 Drawing Sheets

OTHER PUBLICATIONS

K.S. Grimsrud, J.K. Archibald, and B.E. Nelson, "Multiple Pre-Fetch Adaptive Disk Caching," IEEE Transactions on Knowledge and Data Engineering V 5 1 pp. 88-103 1993.

Jeffrey Richter, "Advanced Windows-The Developers Guide to Win-32 API for Windows NT .5 and Windows 95", Microsoft Press, 1995.

R.H. Patterson et al., "Informed Prefetching and Caching" in Proceedings of 15th Symposium on Operating System Principles, pp. 79-95, 1995.

T.C. Mowrey, A.K. Demke, and O. Kreiger. "Automatic Compiler-Inserted I/O Prefetching for Out of Core Application" in Proceedings of the 2nd USENIX Symposium on Operatings Systems Design and Implementation.

C.K. Yang, T. Mitra, and T.C. Chiueh. "A Decoupled Architecture for Application Spcific File Prefetching" USENIX2002.

K. Fraser and F. Chang, "Operating Systems I/O Speculation: How Two Invocations Are Faster Then One," USENIX 2003.

G.C. Gotlieb and G.H. MacEwan, "Performance of Movable-Head Disk Storage Devices," Journal of the ACM, vol. 20 (4), pp. 604-623, 1973.

R. Geist and S.Daniel, "A Continuum of Disk Scheduling Algorithms" ACM Transactions on Computer System, vol. 5 (1), pp. 77-92 (1987).

* cited by examiner

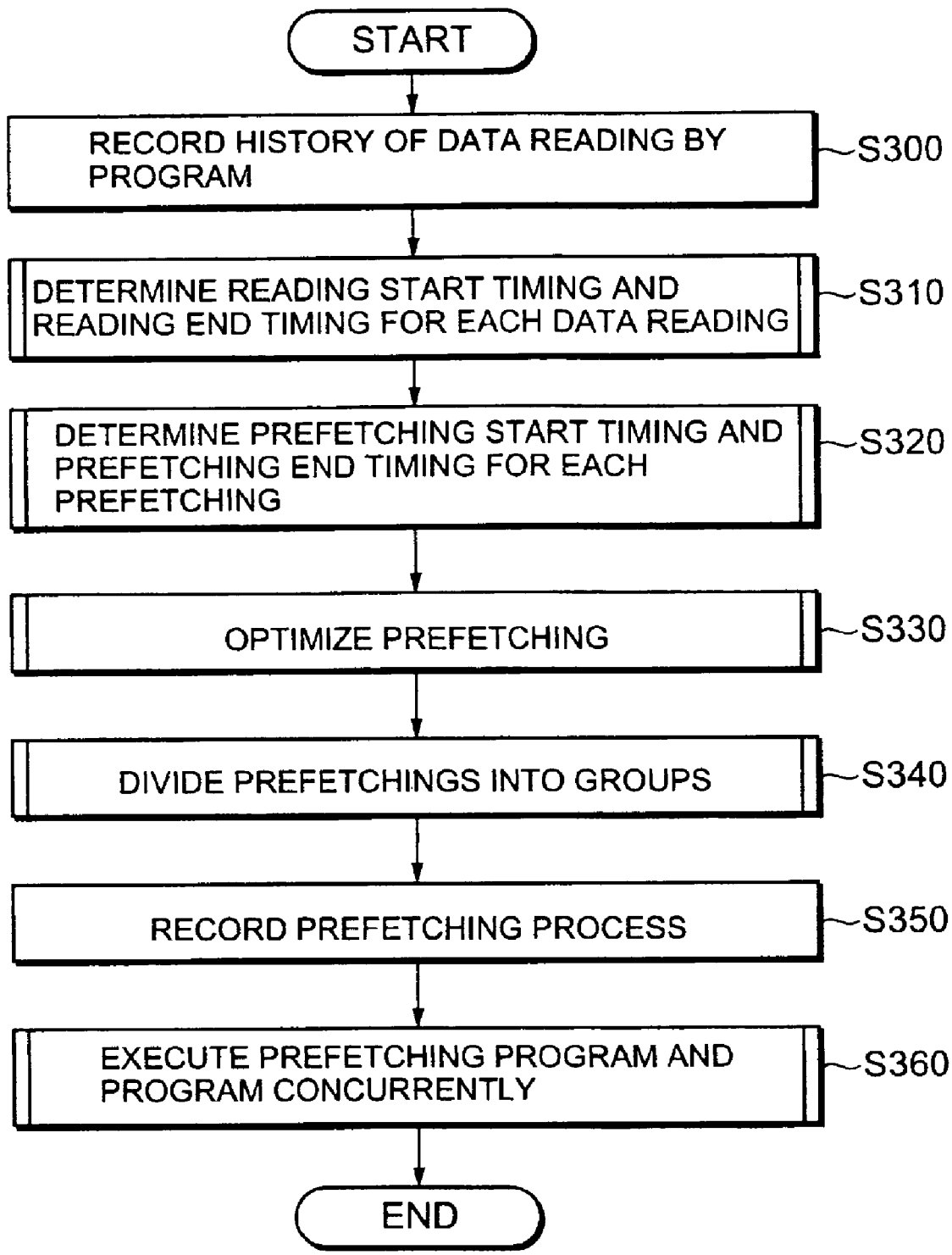

```
1:  Tr_total = 0;
2:  T_total = 0;
3:  Tclr = 0;
4:  for (P = REPEAT PREFETCHING PROCESS BEGINNING WITH FIRST COMPONENT) {
5:      Tc = (START TIME, IN PROFILE, OF DATA READING PROCESS CONSONANT WITH P) - Tclr;
6:      Tclr = END TIME, IN PROFILE, OF DATA READING PROCESS CONSONANT WITH P;
7:      Tr_total += PROCESSING TIME REQUIRED FOR DATA READING PROCESS CONSONANT WITH P;
8:      if (T_total + Tc > Tr_total) {
9:          T_total += Tc;
10:     } else {
11:         T_total = Tr_total;
12:     }
13:     FINAL READING END TIME OF DATA READING PROCESS CONSONANT WITH P = T_total;
14: }
```

1: P0 = (FINAL PREFETCHING IN PREFETCHING PROCESS)
2: (LAST P0 START TIME) = (DATA READING PROCESS START TIME CORRESPONDING TO P0)
   - (PROCESS TIME REQUIRED FOR DATA READING PROCESS CONSONANT WITH P0)
3: T_deadline = (LAST P0 START TIME)
4: for (P = REPEAT PREFETCHING PROCESS BY TRACKING LIST IN INVERTED ORDER BEGINNING WITH PRECEDING COMPONENT P0)
5: {
6:   if (T_deadline < (DATA READING PROCESS START TIME CONSONANT WITH P) {
7:     (LAST P START TIME) = T_deadline - (PROCESS TIME REQUIRED FOR DATA READING PROCESS CONSONANT WITH P)
8:   } else {
9:     (LAST P START TIME) = (DATA READING PROCESS START TIME CONSONANT WITH P)
        - (PROCESS TIME REQUIRED FOR DATA READING PROCESS CONSONANT WITH P)
10:  }
11:  T_deadline = (LAST P START TIME)
12: }

```
1:  P1 = (FIRST PREFETCHING PROCESS COMPONENT)
2:  (P1 START TIME) = 0;
3:  P2 = (COMPONENT NEXT TO P1 IN PREFETCHING PROCESS)
4:  while (REPEAT WHILE P2 NOT NULL)
5:  {
6:      F1 = (LAST P2 START TIME) - (P1 START TIME);
7:      F2 = (START TIME FOR DATA READING PROCESS CONSONANT WITH P1) - (P1 START TIME);
8:      free_time = min (F1, F2)
9:      if (free_time > (TIME REQUIRED FOR P1 PROCESS)) {
10:         for (;;) {
11:             lower = (PREFETCHING PROCESS TIME REQUIRED FOR ONE PREFETCHING OF PRECEDING AREA OF P1 AREA)
12:             upper = (PREFETCHING PROCESS TIME REQUIRED FOR ONE PREFETCHING OF SUCCEEDING AREA OF P1 AREA)
13:             if (isLowerSelected (P1, lower, upper, free_time)) {
14:                 concatinateLowerPrefetch (P1);
15:             } else if (isUpperSelected (P1, lower, upper, free_time)) {
16:                 concatinateUpperPrefetch (P1);
17:             } else {
18:                 break; // end of for
19:             }
20:         }
21:     }
22:     (P2 START TIME) = (P1 START TIME) + (TIME REQUIRED FOR P1 PROCESS)
23:     P1 = P2;
24:     P2 = (COMPONENT NEXT TO P1 IN PREFETCHING PROCESS)
25: }
```

```
1:  Tr_total = Tp_current = Tc_offset = Tc_base = profidx = n_states = total_cache_size = 0
2:  for (P = REPEAT PREFETCHING PROCESS BY SEQUENTIALLY TRACKING COMPONENTS IN PREFETCHING PROCESS) {
3:      current_cache_size = 0;
4:      start_pref = P;
5:      while (REPEAT WHILE P NOT NULL) {
6:          Tp_current += (TIME REQUIRED FOR P PROCESS)
7:          total_cache_size += (DATA SIZE TO BE ADDED TO BUFFER BY P)
8:          total_cache_size -= (BUFFER SIZE USED FOR EXECUTION OF APPLICATION BY THE TIME PROCESS FOR P
                                IS COMPLETED)
9:          T_target = (LAST START TIME FOR NEXT COMPONENT OF PREFETCHING PROCESS) - (TIME REQUIRED FOR
                        SYNCHRONIZATION)
10:         T_nextRead = (TIME AT WHICH FIRST DATA READING PROCESS IS TO BE STARTED AFTER THE TIME AT WHICH
                          PROCESS FOR P IS COMPLETED)
11:         if (total_cache_size > (THRESHOLD VALUE FOR SIZE OF BUFFER THAT IS HELD) &&
                T_target > Tp_current && T_target > T_nextRead) {
12:             break;
13:         }
14:         P = (COMPONENT NEXT TO P IN PREFETCHING PROCESS)
15:     }
16:     targetRead = (PROCESS FOR DETECTING DATA READING PROCESS FOR PERFORMING SYNCHRONIZATION
                      S345 (P, T_nextRead, T_target, total_cache_size)
                      // read PROCESS FOR PERFORMING SYNCHRONIZATION
17:     makeNode (start_pref, P, targetRead)  //
18: }
```

```
1:  PROCESS FOR DETECTING DATA READING PROCESS FOR PERFORMING SYNCHRONIZATION (P, T_nextRead, T_target, total_cache_size)
2:  {
3:    syncRead = (FIRST DATA READING PROCESS TO BE PERFORMED AFTER THE TIME AT WHICH PROCESS FOR P IS COMPLETED)
4:    for (T_currRead = T_nextRead; T_currRead < T_target;
          T_currRead = TIME OF syncRead)
5:    {
6:      total_cache_size -= (BUFFER SIZE USED FOR EXECUTION OF syncRead)
7:      if (total_cache_size < (THRESHOLD VALUE OF LOWER LIMIT VALUE FOR SIZE OF BUFFER THAT IS HELD))
8:      {
9:        break;
10:     }
11:     syncRead = DATA READING PROCESS NEXT TO syncRead
12:   }
13:   return syncRead
14: }
```

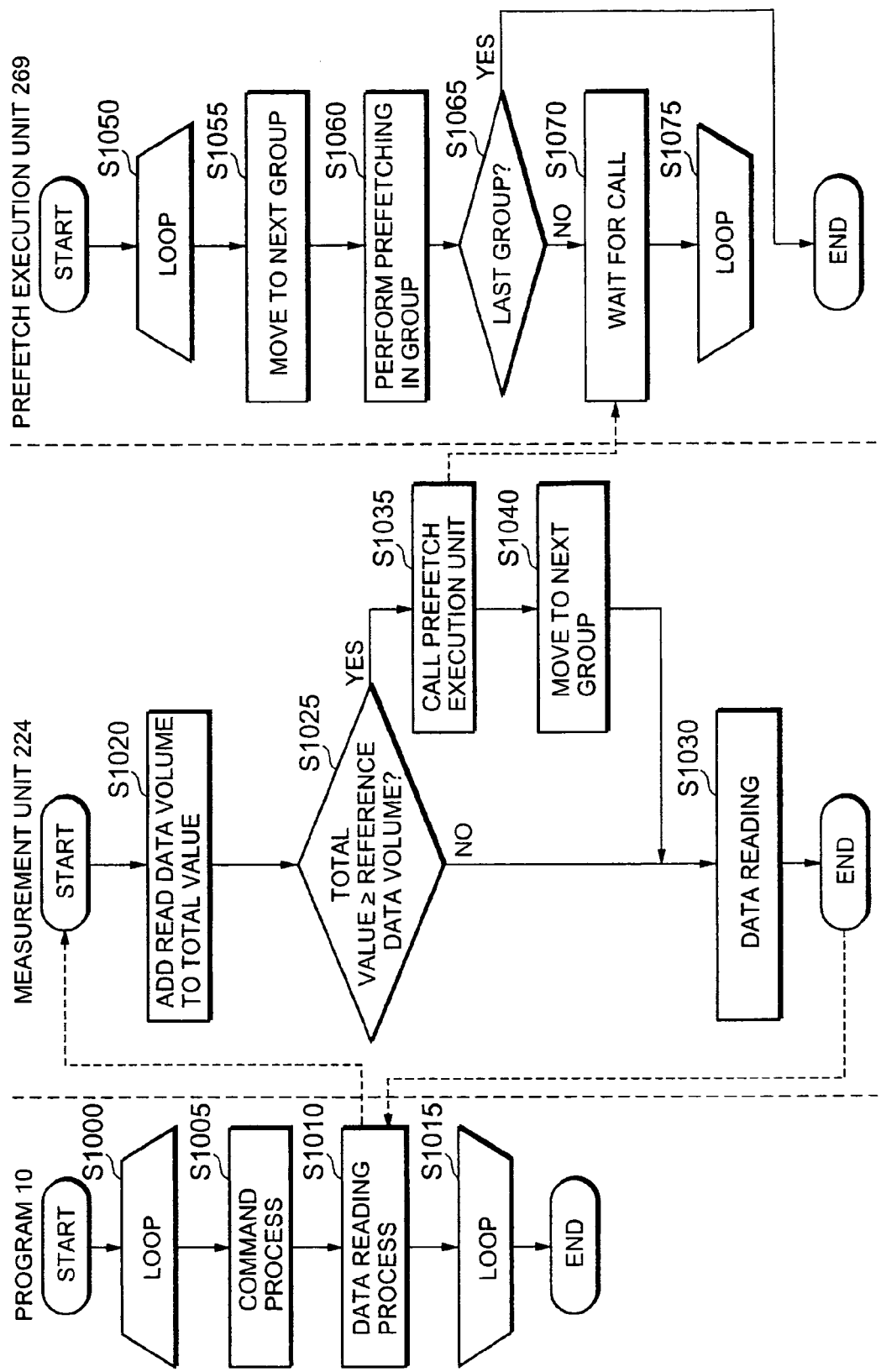

PREFETCHING APPARATUS, PREFETCHING METHOD AND PREFETCHING PROGRAM PRODUCT

BACKGROUND

1. Field of the Invention

The present invention relates to a prefetching apparatus, a prefetching method, and a prefetching program. Particularly, the present invention relates to a prefetching apparatus for prefetching data from a file to a buffer before the data is read by a program, and a prefetching method and a prefetching program therefor.

2. Background of the Invention

As a consequence of recent increases in the processing speeds of processors, the times required to read data from external storage devices, such as hard disk drives, are greatly extended, when compared with the processing times of the processors. Therefore, when to process data a processor must first read the data from an external storage device, the processor will frequently fall into an input/output wait (IO wait) state during an extended period between the time a reading request is issued to the external storage device and the time the reading is completed.

As methods for preventing performance reductions due to input/output wait times, various techniques have been proposed for the prefetching (prefetching) of data stored on external storage devices.

In non-patent documents 1 and 2, techniques are disclosed whereby whether a file is read sequencially is detected each time a program is executed, and when the file is read sequencially, the file is prefetched sequencially from top of the file to the bottom.

In non-patent documents 3 to 5, techniques are disclosed whereby a program is executed in advance and information for files accessed by the program is collected as a profile, and whereby files are prefetched based on the profile. Further, according to non-patent document 3 and 4, a technique is disclosed whereby the order in which a series of files are to be accessed by individual programs is generated based on a profile, and whereby, when a specific file is accessed during the execution of a program, the next file is prefetched. According to the technique in non-patent document 5, information for designating a cluster that highly probably will be accessed next, following a current cluster, is stored for each cluster on a hard disk. Then, when a specific cluster is read, a cluster it is highly probable will be accessed is prefetched.

In non-patent documents 6 and 7, a method is disclosed whereby data to be prefetched from an external storage device are designated by a program, to ensure that appropriate data are prefetched.

In non-patent document 8, a method is disclosed whereby a file access pattern is detected by analyzing a program during the compilation, and the computer is used to insert a prefetching process into execution code.

In non-patent documents 9 and 10, a method is disclosed whereby prefetching is performed by using a prefetching program from which an unnecessary process to I/O, for example, is removed. That is, prior to the execution of an original program, a prefetching program is executed to prefetch data and the original program is permitted to use the obtained data.

In non-patent documents 11 and 12, a technique is disclosed whereby the order in which access requests are issued to a hard disk is rearranged to reduce the seek time for a head.

[Non-Patent Document 1] R. J. Feiertang and E. I. Organisk, "The Multics Input/Output System", in Proceedings of Third Symposium on Operating System Principles, pp. 35-41, 1971

[Non-Patent Document 2] M. K. McKusick, W. J. Joy, S. J. Leffler, and R. S. Fabry, "A Fast File System for Unix", ACM Transactions on Computer Systems, 2(3), pp. 181-197, 1984

[Non-Patent Document 3] H. Lei and D. Duchamp, "An Analytical Approach to File Prefetching", USENIX 1997, 1997

[Non-Patent Document 4] J. Griffioen and R. Appleton, "Reducing File System Latency using a Predictive Approach", in Proceedings of the USENIX Summer Technical Conference, pp. 197-207, 1994

[Non-Patent Document 5] K. S. Grimsrud, J. K. Archibald, and B. E. Nelson, "Multiple Prefetch Adaptive Disk Caching", IEEE Transaction on Knowledge and Data Engineering, Vol. 5, No. 1, pp. 88-103, 1993

[Non-Patent Document 6] Jeffrey Richter, "Advanced Windows—The Developer's Guide to the Win32(r) API for Windows NT(tm) 3.5 and Windows 95", Microsoft Press, 1995

[Non-Patent Document 7] R. H. Patterson, et. al., "Informed Prefetching and Caching", in Proceedings of Fifteenth Symposium on Operating System Principles, pp. 79-95, 1995

[Non-Patent Document 8] T. C. Mowry, A. K. Demke, and O. Krieger, "Automatic Compiler-Inserted I/O Prefetching for Out-of-Core Application", in Proceedings of the 2nd USENIX Symposium on Operating Systems Design and Implementation, 1996

[Non-Patent Document 9] C. K. Yang, T. Mitra, and T. C. Chiueh, "A Decoupled Architecture for Application-Specific File Prefetching", USENIX 2002, 2002

[Non-Patent Document 10] K. Fraser and F. Chang, "Operating System I/O Speculation:

How two invocations are faster than one", USENIX 2003, 2003

[Non-Patent Document 11] C. C. Gotlieb and G. H. MacEwen, "Performance of Movable-Head Disk Storage Devices", Journal of ACM, Vol. 20, No. 4, pp. 604-623, 1973

[Non-Patent Document 12] R. Geist and S. Daniel, "A Continuum of Disk Scheduling Algorithms, ACM Transactions on Computer Systems", Vol. 5, No. 1, pp. 77-92, 1987

SUMMARY OF THE INVENTION

Recently, a system employing a program using Java (registered trademark) has been distributed as an information system wherein multiple information processing apparatuses are connected via a network. In the Java (registered trademark) program environment, multiple classes, each of which is an execution unit of a program, are stored in a JAR file (Java (registered trademark) ARchive File). Therefore, in order to execute an application program using Java (registered trademark), multiple classes must be read from the JAR file when the application program is activated.

Since necessary class files are sequentially read at the time of activation, readings at irregular access locations are issued relative to the JAR file.

On the other hand, according to the prefetching methods disclosed in the non-patent documents 1 and 2, since the files are prefetched each time, prefetching can not be appropriately performed in the Java (registered trademark) program environment. Further, according to the prefetching methods disclosed in non-patent documents 3 to 5, the storage capacity of a cache for prefetch data and the prefetching timing are not considered, and the prefetching effects, depending on the programs, may not be obtained.

According to the prefetching methods disclosed in non-patent documents 6 and 7, since a program creator must designate the data to be prefetched, the load imposed by the preparation of a program is increased.

Furthermore, according to the prefetching method disclosed in non-patent document 8, it is difficult for prefetching to be performed in consonance with a comparatively large code area exceeding the range that a compiler can analyze.

In addition, using the prefetching methods disclosed in non-patent documents 9 and 10, since part of a program to be executed is eliminated, the operation processing for a prefetching program may not match that for the program to be executed. In this case, different data may be prefetched. Also, since the prefetching program is performed in parallel, the overhead for the execution of the program is increased.

According to non-patent documents 11 and 12, the speed at which data is read that is requested by a program can be increased; however, the processor can not be prevented from falling into the input/output wait state.

The objects of the present invention are to provide a prefetching apparatus, a prefetching method and a prefetching program product that can resolve the above described problems. These objects can be achieved by a combination of the features cited in the independent claims of the present invention. Further, the dependent claims of the present invention specify further specific advantageous examples for this invention.

According to a first aspect of the invention, a prefetching apparatus, for prefetching data from a file to a buffer before the data is read by a program, comprising:

a history recorder, for recording a history for a plurality of data readings issued by the program while performing data reading;

a prefetching generator, for generating a plurality of prefetchings that correspond to the plurality of data readings recorded in the history;

a prefetching process determination unit, for determining, based on the history, the performance order for the plurality of prefetchings; and a prefetching unit, for performing, when following the determination of the performance order the program is executed, the plurality of prefetchings in the performance order, and a prefetching method and a prefetching program product related to this prefetching apparatus are provided.

According to a second aspect of the invention, a prefetching apparatus, for prefetching data from a file to a buffer before the data is read by a program, comprising:

a history recorder, for recording as history a plurality of data readings issued by the program following execution;

a prefetching generator, for generating a plurality of prefetchings that correspond to the plurality of data readings recorded in the history;

a start condition determination unit, for determining, as a prefetching start condition for each of the plurality of prefetchings, a reference data amount that is established using a data amount total for data that the program has required to read;

a measurement unit, for measuring the total amount of data read by the program; and a prefetching unit, for performing the prefetchings when the prefetching start conditions for the plurality of prefetchings are determined and the program is executed and when the total values of the data volumes for the individual prefetchings exceed the reference data amount designated for the prefetchings, and a prefetching method and a prefetching program product related to this prefetching apparatus are provided.

It should be noted that in the overview for the present invention not all the features required for the invention are enumerated, and sub-combinations of these features can also constitute the present invention.

According to the present invention, data can be efficiently prefetched prior to the reading of the data by a program.

BRIEF DESCRIPTION OF THE DRAWINGS

FIG. 3 is a flowchart showing the operation of a prefetching apparatus according to the embodiment of the present invention.

FIG. 4 is a diagram showing the process at S310 performed by the prefetching apparatus according to the embodiment of the present invention.

FIG. 5 is a diagram showing the process at S320 performed by the prefetching apparatus according to the embodiment of the present invention.

FIG. 6 is a diagram showing the process at S330 performed by the prefetching apparatus according to the embodiment of the present invention.

FIG. 7 is a diagram showing the process at S340 performed by the prefetching apparatus according to the embodiment of the present invention.

FIG. 8 is a diagram showing the process at S345 performed by the prefetching apparatus according to the embodiment of the present invention.

FIG. 10 is a flowchart showing the process at S360 performed by the information processing apparatus according to the embodiment of the present invention.

DETAILED DESCRIPTION OF THE INVENTION

The present invention will now be described while referring to the preferred embodiment of the invention. It should be noted, however, that the present invention is not limited to the following embodiment, and that not all the combinations of features explained in the embodiment are always requisite.

Figure 1:
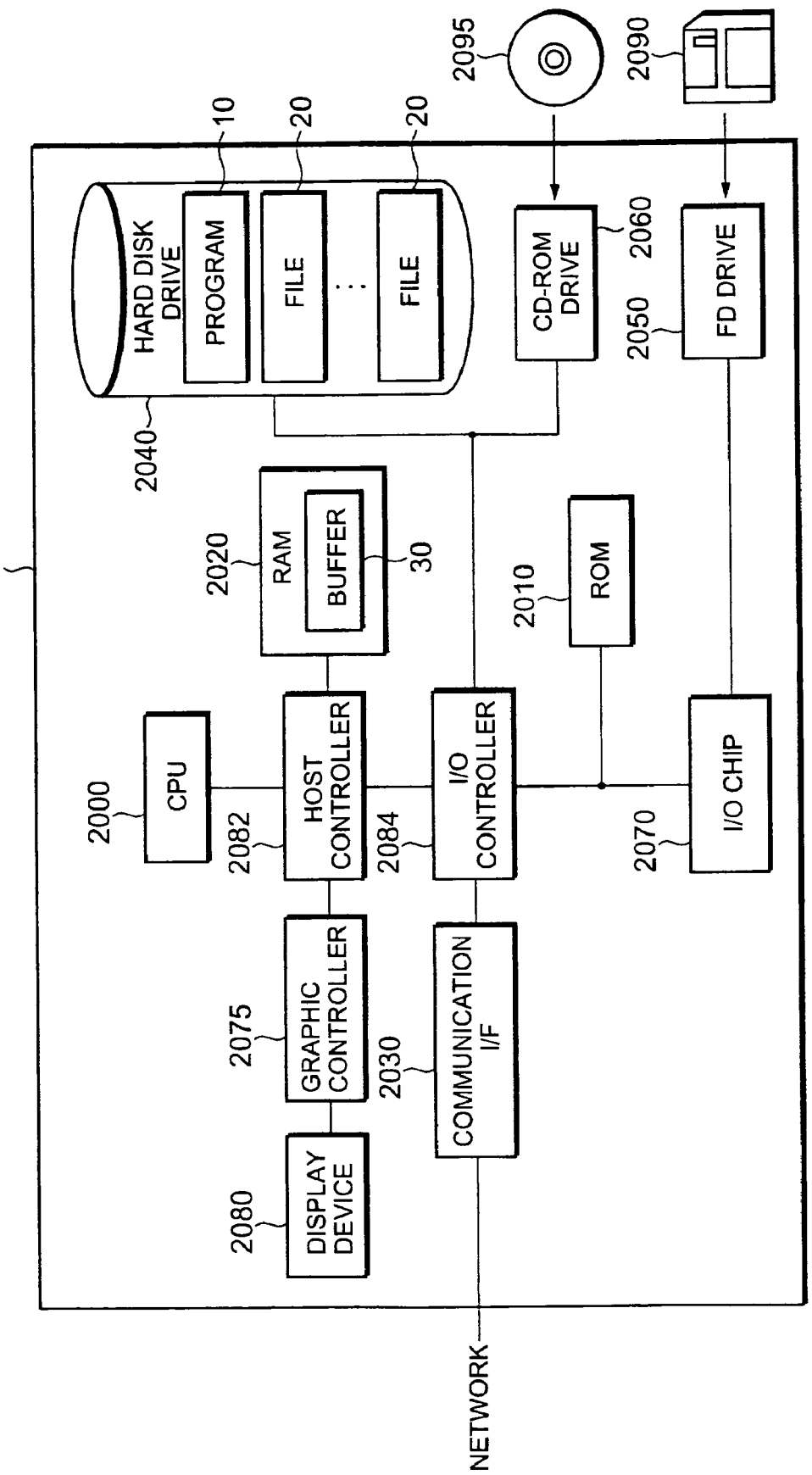
FIG. 1 is a diagram showing an example hardware configuration for an information processing apparatus according to one embodiment of the present invention.

FIG. 1 is a diagram showing an example hardware configuration of an information processing apparatus 1900 according to this embodiment. In this embodiment, the information processing apparatus 1900 executes a program 10, and, in accordance with a request issued by the program 10, reads data from files 20 and transmits the data to the program 10. The information processing apparatus 1900 also serves as a prefetching apparatus according to the present invention that, prior to the reading of data by the program 10 that is executed by the information processing apparatus 1900, prefetches data from the file 20 and stores the data in a buffer 30. Through this processing, the program 10 can obtain data from the buffer 30, instead of reading the data from a hard disk drive 2040, and can perform a command processing after only a minimum input/output wait.

The information processing apparatus 1900 in this embodiment comprises: a CPU peripheral section, including a CPU 2000, a RAM 2020 and a graphic controller 2075, all of which are mutually connected by a host controller 2082; an input/output section, including a communication interface 2030, a hard disk drive 2040 and a CD-ROM drive 2060, which are connected to the host controller 2082 by an input/output controller 2084;

and a legacy input/output section, including a ROM 2010, a flexible disk drive 2050 and an input/output chip 2070, which are connected to the input/output controller 2084.

The host controller 2082 connects the ROM 2020 to the CPU 2000, which accesses the RAM 2020 at a high data transfer rate, and the graphic controller 2075. The CPU 2000 is operated based on programs stored in the ROM 2010 and in the RAM 2020, and controls the individual sections. The graphic controller 2075 obtains image data that the CPU 2000 generates in a frame buffer provided in the RAM 2020, for example, and displays the image data on a display device 2080. Either this, or the graphic controller 2075 may include a frame buffer for storing image data generated by the CPU 2000, for example.

The input/output controller 2084 is connected to the host controller 2082, the communication interface 2030, which is a comparatively fast input/output device, the hard disk drive 2040 and the CD-ROM drive 2060, and the communication interface 2030 communicates with another device via a network. The hard disk drive 2040 is a storage device for storing programs and data used by the information processing apparatus 1900. The hard disk drive 2040 has a larger memory capacity than the RAM 2020, but the required access time is longer. The CD-ROM drive 2060 reads a program, or data, from a CD-ROM 2095, and provides the program, or the data, for the hard disk drive 2040 via the RAM 2020.

The input/output controller 2084 is also connected to the ROM 2010 and to comparatively slow input/output devices, such as the flexible disk drive 2050 and an input/output chip 2070. The ROM 2010 is used, for example, to store a boot program that is executed when the information processing apparatus 1900 is activated, and a program that depends on the hardware provided for the information processing apparatus 1900. The flexible disk drive 2050 reads a program, or data, from a flexible disk 2090, and provides the program, or the data, via the RAM 2020 for the hard disk drive 2040. The input/output chip 2070 is used for the connection of the flexible disk drive 2050 and various types of input/output devices via, for example, a parallel port, a serial port, a keyboard port and a mouse port.

A program transmitted to the hard disk drive 2040 via the RAM 2020 is provided for a user by storing it on the flexible disk 2090, the CD-ROM 2095 or a recording medium such as an IC card. The program is read from the recording medium and is installed, via the RAM 2020, on the hard disk drive 2040 of the information processing apparatus 1900 and is executed by the CPU 2000.

Since the program 10 is installed on the hard disk drive 2040 of the information processing apparatus 12900, or is obtained externally through the communication interface 2030, the program 10 is executed by the information processing apparatus 1900 and reads data to be prefetched, and permits the information processing apparatus 1900 to perform the data processing. The program 10 may, for example, be an application program having a binary form that can be executed by the CPU 2000, or may, for example, be a program that is converted into an executable form, such as the Java (registered trademark) virtual machine command form.

The prefetching program that permits the information processing apparatus 1900 to serve as a prefetching apparatus is installed in the hard disk drive 2040 of the information processing apparatus 1900, and prior to the reading of data by the program 10, prefetches the data from the file 20 stored on the hard disk drive 2040 and stores the data in the buffer 30 that is provided in the RAM 2020.

The above described program or the module may be stored on an external storage medium. As the storage medium, in addition to the flexible disk 2090 or the CD-ROM 2095, an optical recording medium such as a DVD or a PD, a magneto-optical recording medium such as an MO, a tape medium, or a semiconductor memory such as an IC card can be employed. Further, a storage device, such as a hard disk or a RAM, that is provided in a server system connected to a special communication network or the Internet may be employed as a recording medium, and a program may be provided for the information processing apparatus 1900 via the network.

Figure 2:
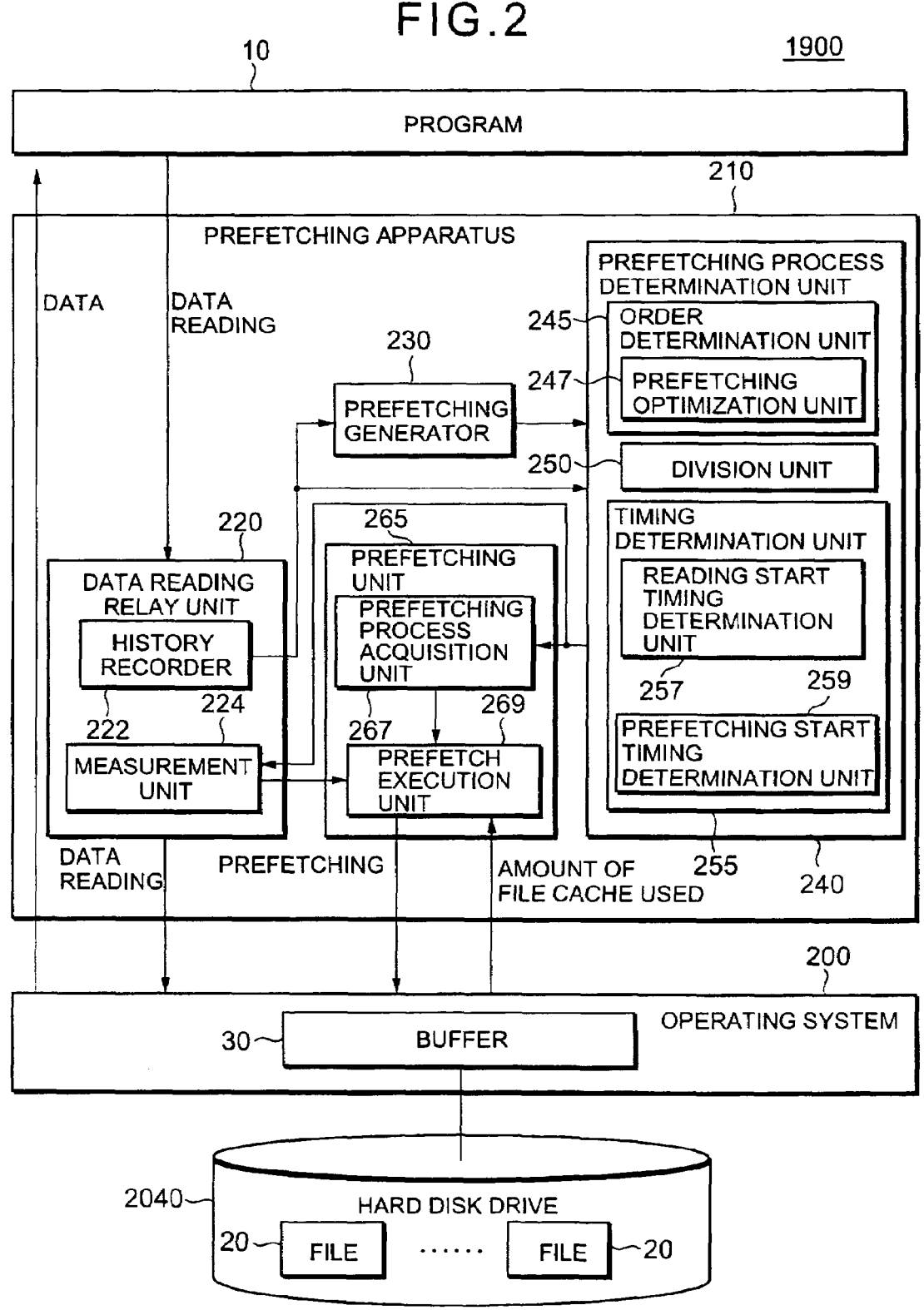
FIG. 2 is a diagram showing the functional arrangement of the information processing apparatus according to the embodiment of the present invention.

FIG. 2 is a diagram showing the functional arrangement of the information processing apparatus 1900 of this embodiment. The information processing apparatus 1900 of this embodiment executes the program 10, an operating system 200 and a prefetching program. By executing the prefetching program, the information processing apparatus 1900 can also serve as a prefetching apparatus 210.

The program 10 is executed by the information processing apparatus 1900, and performs desired data processing by alternately performing a command process and a data reading process for reading data used for the next command process. In the data reading process, the program 10 issues a data reading to the operating system 200, and receives data that the operating system 200 has read from a target file 20.

The operating system 200, which is operated by the information processing apparatus 1900, manages the hardware resources of the information processing apparatus 1900 and permits an application program, such as the program 10, to use these resources. The operating system 200 includes the buffer 30, which is provided by the operating system 200 operated by the information processing apparatus 1900. As an example, the buffer 30 can be a file cache managed by the operating system 200. The file cache is provided by the operating system 200 to cache data read from the file 20 of the hard disk drive 2040 and to reuse the data in accordance with a request issued by the program 10.

The prefetching apparatus 210 is provided when the prefetching program installed, for example, on the hard disk drive 2040 is executed by the information processing apparatus 1900 in parallel to the program 10. The prefetching apparatus 210 prefetches data from the file 20 and stores the data in the buffer 30, prior to the reading of the data by the program 10. The prefetching program includes a data reading relay module, a prefetching generation module, a prefetching process determination module and a prefetching module. These programs or modules cooperate, for example, with the CPU 2000 to permit the information processing apparatus 1900 to function as a data reading relay unit 220, a prefetching generator 230, a prefetching process determination unit 240 and a prefetching unit 265.

The data reading relay unit 220 obtains a data reading that, during the execution, the program 10 has issued to the operating system 200, and starts the process performed by the prefetching apparatus 210 in accordance with the data reading. Then, the data reading relay unit 220 issues the obtained data reading to the operating system 200, and permits the operating system 200 to read data and to transmit the data to the program 10. This function can be achieved, for example, by hooking a data reading function provided by the operating system 200, or by calling the function of the data reading relay unit 200 by rewriting the data reading function.

The data reading relay unit 220 includes a history recorder 222 and a measurement unit 224, the function of which can be achieved by permitting the information processing apparatus 1900 to execute a history recording module and a measurement module. The history recorder 222 records, as a profile, the history of the data readings issued by the program 10 during execution. The measurement unit 224 functions as a prefetching start determination unit, for determining whether a condition wherein the prefetching apparatus 210 should start the next prefetching process is satisfied. In this embodiment, when the program 10 has issued a data reading, the measurement unit 224 counts the total value of a data volume that the program 10 requested be read. When the total value of the data volume reaches a reference data volume that is designated in advance by the prefetching process determination unit 240, in accordance with the prefetching process to be performed next, it is determined that the condition wherein the prefetching process should be started is satisfied. When it is determined that the prefetching process should be started, the measurement unit 224 calls a prefetch execution unit 269 in the prefetching unit 265 to initiate the prefetching process.

The prefetching generator 230 generates a plurality of prefetchings that are consonant with a plurality of data readings recorded in the history by the history recorder 222. Based on the history recorded by the history recorder 222, the prefetching process determination unit 240 determines the execution order for these prefetchings generated by the prefetching generator 230.

In addition to the execution order for a plurality of prefetchings, the prefetching process determination unit 240 also determines start timings as start conditions for starting these prefetchings. Then, the prefetching process determination unit 240 prepares a prefetching process that includes information for the execution order and the start timings that are thus determined, and transmits the prefetching process to the measurement unit 224 and the prefetching process acquisition unit 267. In this embodiment, the prefetching process determination unit 240 includes an order determination unit 245, a division unit 250 and a timing determination unit 255, which are provided by permitting the information processing apparatus 1900 to perform an order determination module, a division module and a timing determination module.

Based on the history recorded by the history recorder 222, the order determination unit 245 determines the execution order and prefetching start timings for multiple prefetchings that are generated by the prefetching generator 230. The order determination unit 245 also includes a prefetching optimization unit 247, which optimizes the execution order for a plurality of prefetchings. For the optimization of prefetchings, the prefetching optimization unit 247 of this embodiment replaces, collectively, with one prefetching, two or more prefetchings for reading data individually from the contiguous areas on the hard disk drive 2040.

The division unit 250 divides a plurality of prefetchings into a plurality of groups, each of which includes one or more prefetchings. Each time the measurement unit 224 calls the prefetch execution unit 269 in this embodiment, the prefetch execution unit 269 collectively performs one or more prefetchings that belong to a group to be processed next. Through this process, since the number of times the measurement unit 224 calls the prefetch execution 269 is reduced, accordingly, the prefetching overhead is reduced.

The timing determination unit 255 functions as a timing determination unit and/or a start condition determination unit according to this invention, and determines prefetching start timings as start conditions for starting the individual prefetchings. In this embodiment, for each of the groups generated by the division unit 250, the timing determination unit 255 determines group start timings for starting one or more prefetchings included in the group. More specifically, the timing determination unit 255 of this embodiment determines the group start timings as a condition that the total value of a data volume measured by the measurement unit 224 should satisfy.

The timing determination unit 255 includes a reading start timing determination unit 257 and a prefetching start timing determination unit 259. The reading start timing determination unit 257 employs a data reading history recorded by the history recorder 222 to determine reading start timings at which the individual data reading processes should be started when the program 10 is efficiently executed by prefetching. The prefetching start timing determination unit 259 determines prefetching start timings at which prefetchings consonant with the data readings should be started, so that the prefetchings are completed at the reading start timings for the individual data reading processes. In this embodiment, the prefetching start timing determination unit 259 determines, as a condition for starting each of the prefetchings, a reference data volume that should be reached by the total value of the data volume requested by the program 10 to be read.

When the prefetching process determination unit 240 has determined the execution order and the start timings for the plurality of prefetchings and transmitted the prefetching process to the prefetching unit 265, and when the program 10 is executed thereafter, the prefetching unit 265 performs the individual prefetchings in accordance with the execution order and at the start timings written in the prefetching process. It should be noted that the prefetching unit 265 includes the prefetching process acquisition unit 267 and the prefetch execution unit 269, which are provided by permitting the information processing apparatus 1900 to perform as a prefetching process acquisition module and a prefetch execution module. As the program 10 is executed, the prefetching process acquisition unit 267 obtains the prefetching process for the program 10 from the prefetching process determination unit 240.

When the condition for starting the prefetching is satisfied, the prefetch execution unit 269 is called by the measurement unit 224 and performs the individual prefetchings for the program 10 in accordance with the prefetching process obtained by the prefetching process acquisition unit 267. More specifically, the prefetch execution unit 269 is called by the measurement unit 224, performs one or more prefetchings that are included in one group, and thereafter falls into the wait state. Then, the next time the prefetch execution unit 269 is called by the measurement unit 224, the prefetch execution unit 269 performs one or more prefetchings included in the succeeding group.

During the prefetching process, the prefetch execution unit 269 of this embodiment issues an instruction to the operating system 200 to read target data in the file 20 prior to the data reading performed by the program 10. Thus, the operating system 200 reads the target data from the file 20 and stores the data in the buffer 30. As a result, upon receiving a data reading from the program 10, the operating system 200 can return the target data that are already present in the buffer 30.

According to the above described prefetching apparatus 210, the history of the data reading performed by the program 10 is obtained, and based on the history, an appropriate prefetching process is generated. Therefore, when the program 10 is executed after the prefetching process is generated, the prefetching apparatus 10 can appropriately perform prefetchings in accordance with the prefetching process. Further, for individual data readings performed by the program 10, the measurement unit 224 need only perform a process for adding a volume of data that has been read to the total current data volume, and a process for comparing the total value of the data volume with the reference data volume. Furthermore, the prefetch execution unit 269 is called when the prefetching start condition is satisfied, and can collectively perform one or more prefetchings that belong to the same group. Therefore, the prefetching apparatus 210 can efficiently perform prefetching with a small overhead.

Instead of employing the buffer 30 of the operating system 200 to perform prefetching, the buffer 30 and a buffer management unit that manages the buffer 30 may be internally provided for the prefetching apparatus 210. According to this arrangement, during the prefetching process, the prefetch execution unit 269 may issue an instruction to transmit target data to the program 10, without storing the target data in the file cache of the operating system 200. Furthermore, the buffer management unit, internally provided in the prefetching apparatus 210, stores in the buffer 30 target data obtained by prefetching, and transmits the target data to the program 10 in accordance with data reading performed by the program 10.

FIG. 3 is a flowchart showing the operation of the prefetching apparatus 210 according to this embodiment.

First, when execution of the program 10 is begun while a prefetching process has not yet been generated, the history recorder 222 records, as a profile, the history of data readings issued by the program 10 during the execution (S300). In the history, the history recorder 222 may record, for example, an argument, a return value, a thread identifier and a time required for the process, for the input/output process, performed for the hard disk drive 2040, that the program 10 issues to the operating system 200, e.g., the opening (open), closing (close), reading (read) or writing (write) of the file 20, the moving (lseek) of the access pointer of the file 20, or the copying (dup2) of the identifier of the file 20 that is open. Furthermore, the history recorder 222 in this embodiment records, in the history, timings at which a plurality of command processes, for the program 10, and a plurality of command data reading processes, for reading data used for these command processes, were performed. That is, in the history, the history recorder 222 records, as a period during which the program 10 performed the data reading process, a period between the time at which the program 10 issued data timing and the time at which the operating system 200 forwarded data to the program in response to the data reading. Also in the history, the history recorder 222 records, as a period for a command process that employed data that were read by data reading that had just been completed, a period extending from the timing for the completion of current data reading to the timing for the start of the succeeding data reading.

By referring to the history for the execution of the program 10 when prefetching had not yet been performed, the reading start timing determination unit 257 determines reading start timings, at which the individual data reading processes should be started, and reading end timings, at which the processes should be completed, when the program 10 is to be efficiently executed by employing prefetching (S310).

Sequentially, the prefetching generator 230 generates a plurality of prefetchings consonant with a plurality of data readings recorded in the history, and determines prefetching start timings, at which the individual prefetchings generated by the prefetching start timing determination unit 259 should be started, and prefetching end timings, at which the prefetchings should be completed (S320). Then, the prefetching optimization unit 247 optimizes the execution order for these prefetchings (S330).

Following this, the division unit 350 divides into a plurality of groups, each of which includes one or more prefetchings, prefetchings that are generated by the prefetching generator 230 and establishes an execution order that is determined by the order determination unit 245 (S340). Thereafter, the prefetching process determination unit 240 stores a prefetching process, prepared at S310 to S340, on a storage device, such as the hard disk drive 2040 or the RAM 2020 (S350).

Next, when the program 10 is executed while the prefetching process is being generated, the prefetching program is performed parallel to the program 10 (S360). As a result, the information processing apparatus 1900 also functions as the prefetching apparatus 210, and prior to data reading being performed by the program 10, target data are prefetched from the file 20 and are stored in the buffer 30.

FIG. 4 is a diagram showing the process performed at S310 by the prefetching apparatus 210 of the embodiment.

As the preprocess for the process at S310, the prefetching generator 230 reads the history recorded by the history recorder 222, and arranges, in a time series, a plurality of data readings recorded in the history. In this case, for each file 20 targeted for data reading, the prefetching generator 230 may arrange data readings in a time series. In this embodiment, from the data readings recorded by the history recorder 222, the prefetching generator 230 excludes a data reading, for which a reading command relative to the hard disk dive 2040 is not issued, and prepares the above sequence for data readings for which a reading command is issued relative to the hard disk drive 2040. That is, when the hard disk drive 2040 is a storage device to be accessed by each block, such as a cluster, of the blocks wherein one or multiple files 20 are recorded, the prefetching generator 230 excludes a data reading such that data are to be read from blocks that have already been read, and prepares the above sequence for data readings so that data are to be read from blocks that have not yet been read.

Following this, for each of a plurality of data readings in the sequence, the prefetching generator 230 generates a prefetching process for prefetching target data for the data reading. In this case, the prefetching generator 230 arranges these prefetching processes in the same execution order as that for the data readings.

Sequentially, on the assumption that, through the process in FIG. 4, a plurality of command processes and a plurality of data reading processes will respectively be performed in the order recorded in the history, the timing determination unit 255 obtains timings (times) at which the individual data reading processes should be started when the command processes and the data reading processes are to be performed in parallel. In this case, as the reading start timings at which the individual data reading processes should be started, the timing determination unit 255 determines the latest timings for a range within which a data reading process can be completed before a corresponding command process, using data that have been read during the data reading process, is started, and that the data reading process can be performed parallel to another command process that is performed before the corresponding command process.

More specifically, in accordance with the repetitive processing beginning with the fourth line in FIG. 4, the timing determination unit 255 performs a procedure from the fifth line to the thirteenth line in FIG. 4, generated by the prefetching generator 230, beginning with the first prefetching in the tentative prefetching process that includes a plurality of prefetchings. On the fifth line, the timing determination unit 255 subtracts, from a data reading start timing consonant with a target prefetching P, a data reading end timing Tclr consonant with the preceding prefetching for the prefetching P, and obtains a time Tc, which is required for a command process that employs data read by data reading consonant with the preceding data reading of the prefetching P. Then, on the sixth line, the timing determination unit 255 updates the data reading end timing Tclr to obtain a data reading end timing for the prefetching P.

Following this, on the seventh line, the timing determination unit 255 adds a processing time, for data reading consonant with the prefetching P, to a total value Tr_total for the processing time for the data reading, and updates the total value Tr_total. Thereafter, from the eighth line to the thirteenth line, the timing determination unit 255 obtains the final reading end timing consonant with the prefetching P. More specifically, the timing determination unit 255 adds to the end timing T_total, for the preceding data reading, the time Tc, during which the command process is performed that employs data read by the preceding data reading, and obtains a timing T_total+Tc at which the CPU 2000 can start the command processing that employs data reading consonant with the prefetching P. Then, the timing determination unit 255 compares the timing T_total+Tc with the timing Tr_total that permits the data reading consonant with the prefetching P to be completed by taking into consideration the restrictive reading speed of the hard disk drive 2040, and determines the later timing to be the final reading end timing.

Through the above described processing, the timing determination unit 255 can obtain the final reading end timings for the individual data readings. And based on the final reading end timings for the individual data readings and the time required for data readings recorded in the history, the timing determination unit 255 obtains the final reading start timings for starting the data readings.

FIG. 5 is a diagram showing the procedure at S320 performed by the prefetching apparatus 210 of the embodiment.

On the assumption that a plurality of prefetchings are to be successively performed, the prefetching start timing determination unit 259 employs the last reading end timings for the individual data readings and the processing periods required by the data readings recorded in the history to determine the last reading start timings at which to start the individual data readings.

More specifically, the prefetching start timing determination unit 259 tracks the tentative prefetching processing procedures in order, beginning with the last prefetching, and determines the last prefetching start timing at which to start the prefetching. First, on the second line in FIG. 5, the prefetching start timing determination unit 259 regards the prefetching start timing for the last prefetching P0 as a value obtained by subtracting from the last reading start timing for the last data reading process the processing time required for the data reading process. As a result, the data reading process is initiated following the completion of the prefetching P0 and the length of the period during which the program 10 is in the input/output waiting state is minimized.

Thereafter, during the recursive processing performed from the sixth to the eleventh line for a target prefetching P, the prefetching start timing determination unit 259 subtracts data corresponding to the prefetching P from an earlier timing, either the last prefetching start timing T_deadline for the succeeding prefetching or the last reading start timing for data reading that employs data that have been read by this prefetching. Following this, the start timing for the prefetching P is determined.

Through the above described processing, the prefetching start timing determination unit 259 can obtain the last prefetching start timings for the individual prefetchings. And when the prefetching apparatus 210 sequentially issues these prefetchings so as to satisfy these timings, the input/output process wait time for the program 10 can be minimized, and the command process and the data reading process can be performed efficiently and concurrently.

FIG. 6 is a diagram showing the processing performed at S330 by the prefetching apparatus 210 of this embodiment. Contingent with a condition that two or more prefetchings must be readings of data from two or more contiguous areas of a storage device wherein the files 20 are stored, the prefetching optimization unit 247 of the order determination unit 245 replaces these two or more prefetchings with one prefetching for prefetching data from these contiguous areas and storing the data in the buffer 30. Through this processing, the prefetching apparatus 210 can exchange the execution order for a plurality of prefetchings within a range wherein the last prefetching end timings for the individual prefetchings are satisfied, and can replace two or more prefetchings for adjacent storage areas with one prefetching for contiguous areas. As a result, the prefetching apparatus 210 can shorten the total period of time required for the prefetching processing, compared with when prefetchings are performed individually, and can optimize data readings obtained from the hard disk drive 2040.

At S330, the prefetching optimization unit 247 selects, in order, a first prefetching P1 and a second prefetching P2 in the prefetching process that is obtained as a result of the processing at S320 (lines 1, 2 and 23 and 24). Then, the first prefetching start timing is regarded as 0 (line 2), and the processing time for the prefetching P1 is added to the start timing for the prefetching P1 until the prefetching P2 reaches the end in the prefetching process (line 4), so that the start timing for the succeeding prefetching P2 is obtained (line 22).

The prefetching optimization unit 247 performs the following processing for the prefetching P1.

First, the prefetching optimization unit 247 obtains a free time period free_time that may be employed for the process for the prefetching P1 (lines 6 to 8). This free time period free_time is either a period from the start timing for the prefetching P1 to the last start timing for the succeeding prefetching P2, or a period from the start timing for the prefetching P1 to the timing at which data reading corresponding to the prefetching P1 is issued, whichever is shorter.

Contingent on a condition that the length of the free time period free_time is greater than the processing time required for the prefetching P1, the prefetching optimization unit 247 attempts to combine two or more prefetchings and replace them with one reading (line 9). That is, the prefetching optimization unit 247 obtains a processing time "lower", during which data for one prefetching are to be read from an area on the hard disk drive 2040 where data were read during the prefetching P1 and from a preceding area on the hard disk drive 2040, and a processing time "upper", during which data for one prefetching are to be read from an area on the hard disk 2040 where data were read during the prefetching P1 and from a succeeding area on the hard disk drive 2040 (lines 11 and 12).

Next, the prefetching optimization unit 247 employs an evaluation function "isLowerSelected" and an evaluation function "isUpperSelected" to determine whether a prefetching for reading data in the preceding area should be combined with the prefetching P1 or whether a prefetching for reading data in the succeeding area should be combined with the prefetching P1 (lines 13 and 15). According to the evaluation function "isLowerSelected", since a prefetching Pa, for reading data from the area preceding the one read during the prefetching P1, is performed later during the prefetching process, it is valid for the prefetching Pa to be combined with the original prefetching P1 and for these prefetchings to then be replaced by a new prefetching P1. Furthermore, contingent on the condition that the prefetching P1 obtained by the replacement be completed within the free time period "free_time", the combining of the prefetching Pa with the prefetching P1 is represented as a return value by employing the processing time "lower", the processing time "upper" and the free time period "free_time". Likewise, when a prefetching Pb for reading data from the succeeding area of the prefetching P1 also occurs later in the prefetching process, the prefetching optimization unit 247 may still determine that it is valid for the prefetching Pa to be combined with the prefetching P1, and for these prefetchings to be replaced by a new prefetching P1, when the condition is such that the combining of the prefetching Pa with the prefetching P1 is more effective than the combining of the prefetching Pb with the prefetching P1. That is, when the processing time "lower" is shorter than the processing time "upper", or when the processing time "lower" is nearer the processing time required for the original prefetching P1 than is the processing time "upper", the prefetching optimization unit 247 may determine that it is valid for the prefetching Pa to be combined with the prefetching P1.

When the prefetching optimization unit 247 determines, through the process that uses the evaluation function "isLowerSelected", that the prefetching Pa for reading data from the preceding area be combined with the prefetching P1, the prefetching Pa and the prefetching P1 are combined to obtain a new prefetching P1 (line 14).

According to the evaluation function "isUpperSelected", since the prefetching Pb for reading data from the succeeding area of the prefetching P1 is performed later during in the prefetching process, it is valid for the prefetching Pb to be combined with the prefetching P1, and for these prefetchings to be replaced by a new prefetching P1. Further, contingent on a condition that the prefetching P1 obtained by the replacement be completed within the free time period "fee_time", the combining of the prefetching Pb with the prefetching P1 is represented as a return value by employing the processing time "lower", the processing time "upper" and the free time period "free_time". In this case, as in the evaluation function for "isLowerSelected", when the prefetching Pa for reading data from the preceding area of the prefetching P1 is also occurs later during the prefetching process, the prefetching optimization unit 247 may determine that it is valid for the prefetching Pb to be combined with the prefetching P1 to obtain a new prefetching P1, when the condition is such that the combining of the prefetching Pb with the prefetching P1 is more effective than is the combining of the prefetching Pa with the prefetching P1.

When the prefetching optimization unit 247 determines, through the process that uses the evaluation function "isUpperSelected", that the prefetching Pb for reading data from the succeeding area be combined with the prefetching P1, the prefetching Pb and the prefetching P1 are combined and these prefetchings are replaced by a new prefetching P1 (line 16).

In this manner, the prefetching optimization unit 247 replaces the preceding and succeeding prefetchings of the prefetching P1 collectively with one prefetching P1. When the prefetching optimization unit 247 can not combine any more preceding or succeeding prefetchings with the prefetching P1, the prefetching optimization unit 247 halts the combining process and repeats the above described processing for the next prefetching (lines 10 and 18).

Through this processing, the prefetching optimization unit 247 can replace two or more prefetchings for reading data from two or more adjacent areas with a single prefetching for reading data from contiguous areas that include these two or more areas, and for storing the data in the buffer 30. The prefetching optimization unit 247 performs this replacement process contingent on the condition that two or more prefetchings be readings of data from two or more contiguous areas of a storage device wherein the files 20 are stored, and that, even when those two or more prefetchings are replaced by a single prefetching, for reading data in these areas and storing the data in the buffer 30 in advance, the end timings of all the data reading processes be not later than the start timings of the command processes that employ the data that have been read during the corresponding data reading processes. As a result, the prefetching optimization unit 247 can efficiently perform prefetching, without delaying the processing performed by the program 10.

FIG. 7 is a diagram showing the process at S340 performed by the prefetching apparatus 210 according to this embodiment. In the process at S340, the division unit 250 divides, into a plurality of groups, each of which include one or more prefetchings, a plurality of prefetchings, the execution order for which is determined by the order determination unit 245.

The division unit 250 sequentially adds one or more contiguous prefetchings to the individual groups (lines 2 to 16), and generates, for each group, information to obtain synchronization with the measurement unit 224 (line 17). More specifically, the division unit 250 regards a first prefetching during the prefetching process as a first group (line 2), and sequentially adds succeeding prefetchings that should belong to the same group as does the first prefetching. Thereafter, when the division unit 250 detects a prefetching that should belong to a second group, the division unit 250 sorts this prefetching as a member of the second group, and continues to perform the processing in the same manner.

As to whether a target prefetching P should be added to the current group, this is determined by the division unit 250 in the following manner. First, the division unit 250 adds the processing time required for the target prefetching P to the timing Tp_current required for the completion of the prefetching preceding the prefetching P. Then, the division unit 250 obtains the size of the buffer 30 area occupied by prefetchings. More specifically, the division unit 250 adds to the size of the buffer 30 area used before the prefetching P the volume of the data newly stored in the buffer 30 by the prefetching P (line 7), and subtracts the volume of the data that are read and used by the program 10 before the completion of the prefetching P (line 8). As a result, the division unit 250 can determine how much data stored in the buffer 30 by the prefetching have not yet been read from the buffer 30 by the program 10.

Sequentially, the division unit 250 obtains timing T_target earlier than the last start timing of the succeeding prefetching the length of time required to obtain synchronization with the measurement unit 224 and the prefetch execution unit 269 (line 9). When the target prefetching is included in the succeeding group, the timing T_target is regarded as the last timing at which the measurement unit 224 issued an instruction to start the execution of this group. In addition, the division unit 250 regards, as T_nextRead, the timing at which the program 10 performs a first data reading process following the prefetching P (line 10). Then, the target prefetching P is determined as a first prefetching for the succeeding group (line 12), contingent on the condition that the amount of data used in the buffer 30 does not exceed a predesignated threshold value for the upper limit, that the timing Tp_current at which the prefetching P is completed is earlier than the last timing T_target at which the measurement unit 224 should call the prefetch execution unit 269 to start the following prefetching, and that the program 10 issues a data reading before the timing T_target is reached (line 11). Through this processing, the division unit 250 can divide a plurality of prefetchings into a plurality of groups, so that the amount of data used in the buffer 30 does not exceed the predesignated upper limit value. It should be noted that when the division for a group is not appropriate, the division unit 250 will add a succeeding prefetching to that group even when the amount of data used in the buffer 30 exceeds the upper limit value. For example, when due to the overhead for a call to the prefetch execution unit 269 by the measurement unit 224, the start of the succeeding prefetching is delayed and the last prefetching start timing is not satisfied, or when the program 10 does not issue a data reading during a period preceding the timing at which the measurement unit 224 should call the prefetch execution unit 269, and thus the measurement unit 224 can not be operated, the division unit 250 will add the succeeding prefetching to the current group.

Referring to FIG. 7, the division unit 250 permits the timing determination unit 255 to perform the process at S345 written on the sixteenth line. In accordance with a data reading issued by the program 10, the prefetch execution unit 269 is called by the measurement unit 224, and whether a prefetching included in the following group should be started is determined. Thus, the timing determination unit 255 can determine a group start timing for each group within the range in which the amount of data used in the buffer 30 does not exceed the upper limit value. Furthermore, during a period extending from the completion of the addition of the last prefetching to the current group until when, in the prefetching program, the measurement unit 224 called the prefetch execution unit 265 in order to initiate the succeeding prefetching, the timing determination unit 255 can add the succeeding prefetching to a group following the current group, contingent on the condition that the history that a data reading has been issued by the program 10 is recorded.

FIG. 8 is a diagram showing the process at S345 performed by the prefetching apparatus 210 of this embodiment. Based on the history recorded by the history recorder 222, the timing determination unit 255 sequentially examines data readings issued by the program 10 during a period extending from the completion of the last prefetching P, which was determined by the division unit 250 using the process in FIG. 7, to the last timing T_target (lines 3 and 4). Then, the timing determination unit 255 determines a data reading, in accordance with which the measurement unit 224 should call the prefetch execution unit 269 to start the prefetchings of the succeeding group.

For each data reading, the division unit 250 subtracts, from the amount in the buffer 30, the data volume that is employed for the data reading and is thereafter spent (line 6). Then, when the space used in the buffer 30 is smaller than a predesignated lower limit value, the timing determination unit 255 determines that the measurement unit 224, in accordance with the data reading, should call the prefetch execution unit 269 to start prefetchings to be included in the succeeding group. Through this processing, the timing determination unit 255 sequentially determines group start timings corresponding to the individual groups. It should be noted that the timing determination unit 255 of this embodiment regards as a reference data volume, for defining the start timing for starting the execution of a group following the current group, the total volume of the data that the program 10 has requested be read up until another data reading is issued.

According to the division unit 250 and the timing determination unit 255 described above, a plurality of prefetchings can be divided into groups, so that the last start timings for the individual prefetchings can be satisfied, and the group start timings for starting the execution of these groups can be determined. When the amount buffer 30 space used is smaller than the lower limit value, the timing determination unit 255 determines that prefetching should be started. Thus, the prefetching apparatus 210 can prevent an increase in the consumption of the RAM 2020 due to an increase in the amount of the buffer 30 space used by prefetchings, and can also prevent deterioration of the performance of the program 10. Further, the program 10 can be prevented from falling into the input/output waiting state because of a shortage of data that have been prefetched.

Figure 9:
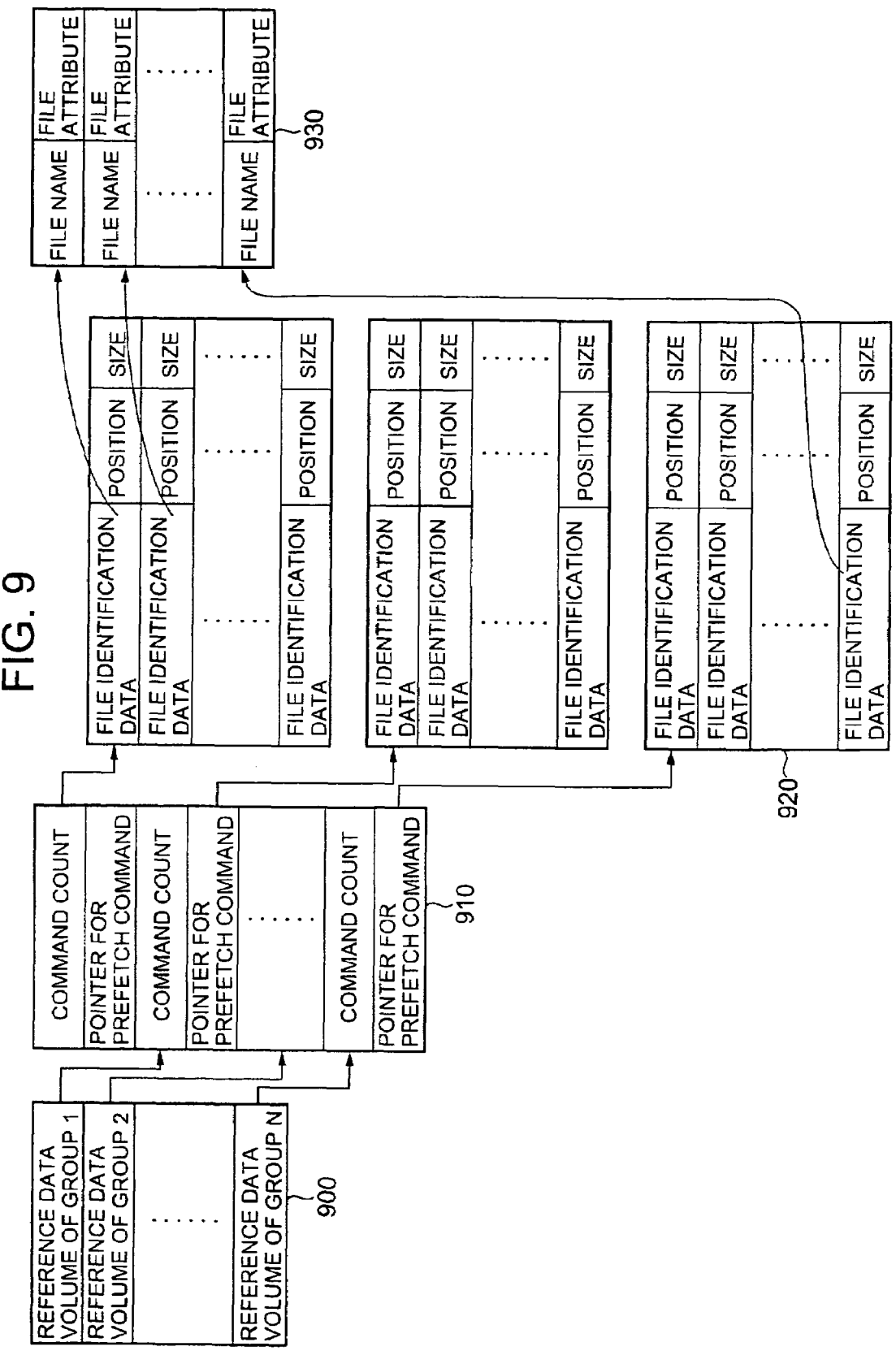
FIG. 9 is a diagram showing a prefetching process recorded by the process at S350 using the prefetching apparatus according to the embodiment of the present invention.

FIG. 9 is a diagram showing an example prefetching process for each program 10 that is recorded by the process at S350 using the prefetching apparatus 210 of the embodiment. The prefetching process in FIG. 9 is written using tables that include a reference data volume table 900, a prefetching group table 910, a one or more prefetching process table 920 and a file management table 930, and is stored in a storage device, such as the RAM 2020 and/or the hard disk drive 2040.

The reference data volume table 900 is used to define, for each of the groups, group start timings for starting prefetchings that belong to the group. In this embodiment, in consonance with each group, the group determination unit 255 determines that prefetchings included in a group should be started contingent on the condition that the total data volume that the program 10 has requested be read exceeds a reference data volume that is designated for the group. Then, the timing determination unit 255 enters, in the reference data volume table 900, the reference data volumes designated that correspond to the individual groups.

In consonance with the individual groups, the number of prefetching commands and the pointers to the prefetching process table 920, in which parameters for the prefetching commands are stored, are entered in the prefetching group table 910. A prefetching process table 920 is provided for each group, and parameters for one or more prefetchings included in a group are written. In this embodiment, file identification data for identifying a target file 20 to be prefetched, information indicating the location of an area to be prefetched in the file 20 and information indicating a volume (size) of data to be prefetched are entered as parameters in the prefetching process table 920.

In the file management table 930, the files 20 consonant with the file identification data are managed that are entered in the prefetching process table 920. For the management of the individual files 20 in the file management table 930, a set consisting of a file name, a path name, with which a file is recorded, and a file attribute are employed.

FIG. 10 is a diagram showing the process at S360 performed by the information processing apparatus 1900 according to this embodiment.

The information processing apparatus 1900 executes the program 10, and alternately repeats a plurality of command processes (S1005) written in the program 10 and a plurality of data reading processes (S1010) (S1000 and S1015). In this manner, the information processing apparatus 1900 performs the information processing written in the program 10.

The data reading relay unit 220 of the prefetching apparatus 210 is called each time a data reading is issued by the process of the program 10. In this embodiment, after the prefetching process has been generated by the prefetching process determination unit 240, the prefetching apparatus 210 inhibits the recording of history by the history recorder 222. In this manner, once the prefetching process has been generated, the deterioration of the execution function of the program 10 due to the recording of history can be avoided. It should be noted that, contingent on the condition that the program 10 or the file 20 has been updated, the prefetching apparatus 210 may erase the prefetching process that has been generated and may permit the history recorder 222 to begin recording history again.

As a data reading is being issued, the measurement unit 224 adds, to the total value, the volume of data the program 10 requests be read (S1020). Then, when the total value of the data volume is greater than the reference data volume consonant with a group to be processed next, the measurement unit 224 calls the prefetching unit 265 (Yes at S1025, and S1035). This call process is performed, for example, by transmitting a signal to a process or a thread of the information processing apparatus 1900 that serves as the prefetch execution unit 269. After the measurement unit 224 has called the prefetching unit 265, the process is shifted to the process for the succeeding group (S1040).

When the condition at S1025 is not satisfied, or when the condition at S1025 is satisfied and the process at S1040 is completed, the measurement unit 224 transfers the data reading, received from the program 10, to the operating system 200, which then transfers the data to the program 10 (S1030).

The prefetch execution unit 269 of the prefetching unit 265 serves as a process or a thread in the information processing apparatus 1900, independent of the program 10 and the measurement unit 224. Further, in accordance with a call from the measurement unit 224, the prefetch execution unit 269 performs prefetchings included in a group to be processed next.

A program that operates the prefetch execution unit 269 is started when the program 10 is activated, and is executed concurrently with the program 10. The prefetch execution unit 269 sequentially processes the individual groups, beginning with the first group (S1050, S1055 and S1075). First, the prefetch execution unit 269 performs one or more prefetchings included in each group (S1060). In this embodiment, to perform prefetching, the prefetch execution unit 269 issues a prefetching relative to the buffer 30 provided by the operating system 200 that is operated by the information processing apparatus 1900, and caches, in advance, targeted data for data reading that is issued by the program 10. When prefetching is completed for a group for which prefetching has been instructed, program control advances to S1065.

Instead of performing the above described processing, when the amount of the buffer 30 space that is used is small, the prefetch execution unit 269 may perform prefetching for two or more groups upon receiving a single call from the measurement unit 224. More specifically, first, upon receiving a call from the measurement unit 224, the prefetch execution unit 269 obtains the amount of buffer 30 space that is in use from the operating system 200. Then, contingent on the condition that the amount of buffer 30 space in use is smaller than a predesignated reference amount, the prefetch execution unit 269 sequentially performs prefetchings included in two or more groups. In this manner, the prefetching apparatus 210 can perform prefetching processes in advance in accordance with the free space in the buffer 30, and the overhead required for the execution of the program 10 can be reduced.

In addition, when it is determined that data that are to be prefetched and that are included in a specific group are already stored in the buffer 30, the prefetch execution unit 269 may halt the prefetching for this group. More specifically, first, the prefetch execution unit 269 measures periods of time that were required for the prefetchings in the group to read data from the file 20 and to store them in the buffer 30. Then, when it is determined that the period of time required for data to be read from the file 20 and stored in the buffer 30, at least by a specific prefetching, is smaller than the predesignated reference time, the prefetch execution unit 269 halts the execution of prefetchings in the group that are to be executed later than the specific prefetching. As a result, the prefetching apparatus 210 can halt the issue of unnecessary prefetchings, and the load imposed on the information processing apparatus 1900 can be reduced.

When the prefetchings in the last group are completed at S11060, the prefetch execution unit 269 terminates the processing (Yes at 1065). When the prefetchings in the last group have not yet been completed, the prefetch execution unit 269 waits for a call from the measurement unit 224 to instruct the prefetchings for the succeeding group (S1070).

According to the above described prefetching apparatus 210, based on the history of data readings issued by the program 10, data used by the program 10 can be appropriately prefetched. Therefore, through data prefetching, the processing performance of the program 10 can be improved, without the program 10 being changed.

The present invention has been explained by employing the embodiment; however, the technical scope of the invention is not limited to that described in the embodiment. To one having ordinary skill in the art it will be obvious that various modifications and improvements can be added to the embodiment, and it will also be obvious, from the description of the claims of the invention, that modes based on modifications or improvements can also be included within the technical scope of the invention.

For example, for each of a plurality of programs 10, the prefetching apparatus 210 may generate the prefetching process shown in FIG. 9 and perform prefetching. That is, for each of the programs 10, the history recorder 222 can record a history for data readings issued by the program 10 during its execution. For each of the programs 10, the prefetching generator 230 can generate a plurality of prefetchings that are consonant with a plurality of readings that are recorded in the history. And for each of the programs 10, the prefetching process determination unit 240 can divide these prefetchings into groups, as needed, and determine the execution order and the start timings for prefetchings.

Furthermore, when the execution order has been determined and one of the programs 10 has been executed, the prefetching process acquisition unit 267 of the prefetching unit 265 can obtain the execution order for the program 10. And the prefetch execution unit 269 can perform a plurality of prefetchings for the program 10 in accordance with the obtained execution order.

Further, the prefetching process determination unit 240 may generate a prefetching process as a program 10 in consonance with an entire program that includes a plurality of sub-routines and/or functions, or may generate a prefetching process for each sub-routine and/or for each function.

In addition, the prefetching apparatus 210 may be provided as an apparatus separate from the information processing apparatus 1900 that executes the program 10. For example, the prefetching apparatus 210 may be connected between a database server, which is an information processing apparatus that manages a database, and an application server, which is an information processing apparatus that operates the program 10, and may read target data to the buffer 30 that is provided in the prefetching apparatus 210, prior to data reading performed by the program 10 that is operated by the application server.

Moreover, the prefetching apparatus 210 may define a reference data volume, which is used as a reference to start the processing for a group, as a volume of data read by the program 10 following the processing of a preceding group.

The measurement unit 224 and the prefetch execution unit 269 may be provided by using the same process or thread. In this case, the prefetch execution unit 269 may issue, as prefetching, asynchronous file data readings to the operating system 200, and may return a process to the program 10.

The invention claimed is:

1. A prefetching method, for prefetching data from a file to a buffer before the data is read by a program product, comprising:
   recording a history for a plurality of data readings, said history including timings at which a plurality of command processes, for the program product, and a plurality of data reading processes, for reading data used for command processes, were performed, said command timings including a period extending from a completion of a current data reading to a start of a succeeding data reading and said data reading processes timing including a period between a time at which a request for data is issued until a time a response to said request is returned;
   measuring a total value for a volume of data for which reading by the program product has been requested and when said total value of the volume of data exceeds a reference data value, performing:
   arranging said data readings in said history in a time series order;
   generating a plurality of prefetchings that correspond to the plurality of data readings recorded in the history;
      determining, for each of said plurality of prefetchings, a start time and an end time consonant with the plurality of data readings recorded in the history, wherein said prefetchings are completed prior to a start time of a corresponding one of the data readings,
      determining an execution order for the plurality of prefetchings based on said prefetching start and end times;
      optimizing said execution order when two or more prefetchings are readings of data from two or more contiguous areas by collectively replacing with one prefetching said two or more prefetchings, wherein a preceding and a succeeding prefetching of said one prefetching is collected as said one prefetching;
      dividing the plurality of prefetchings into a plurality of groups by sequentially adding one or more prefetchings to each of the groups, wherein prefetchings are added to a group so that a usage rate for the buffer for data that have been read into the buffer by prefetching and have not yet been read from the buffer by the program product, does not exceed a predetermined upper limit value, wherein additional prefetchings are added to a group in violation of said predetermined upper limit value when a processing overhead causes delay of a succeeding prefetching or a read is not issued during a period preceding a prefetching;
      determining group start timings in consonance with each of the groups, to start one or more prefetchings included in the group wherein the group start timings for the individual groups are determined so that the usage rate for the buffer does not exceed the upper limit value; and
   executing at least one of said prefetchings included in each of the groups, at the group start timings that correspond to the group, wherein prefetchings included in a next group are started when the usage rate for the buffer is lower than a predesignated lower limit value.

* * * * *